Nov. 3, 1970    J. B. FERGUSON, JR., ETAL    3,537,689
WASTE MATERIAL TREATING APPARATUS
Filed June 14, 1968                         4 Sheets-Sheet 2

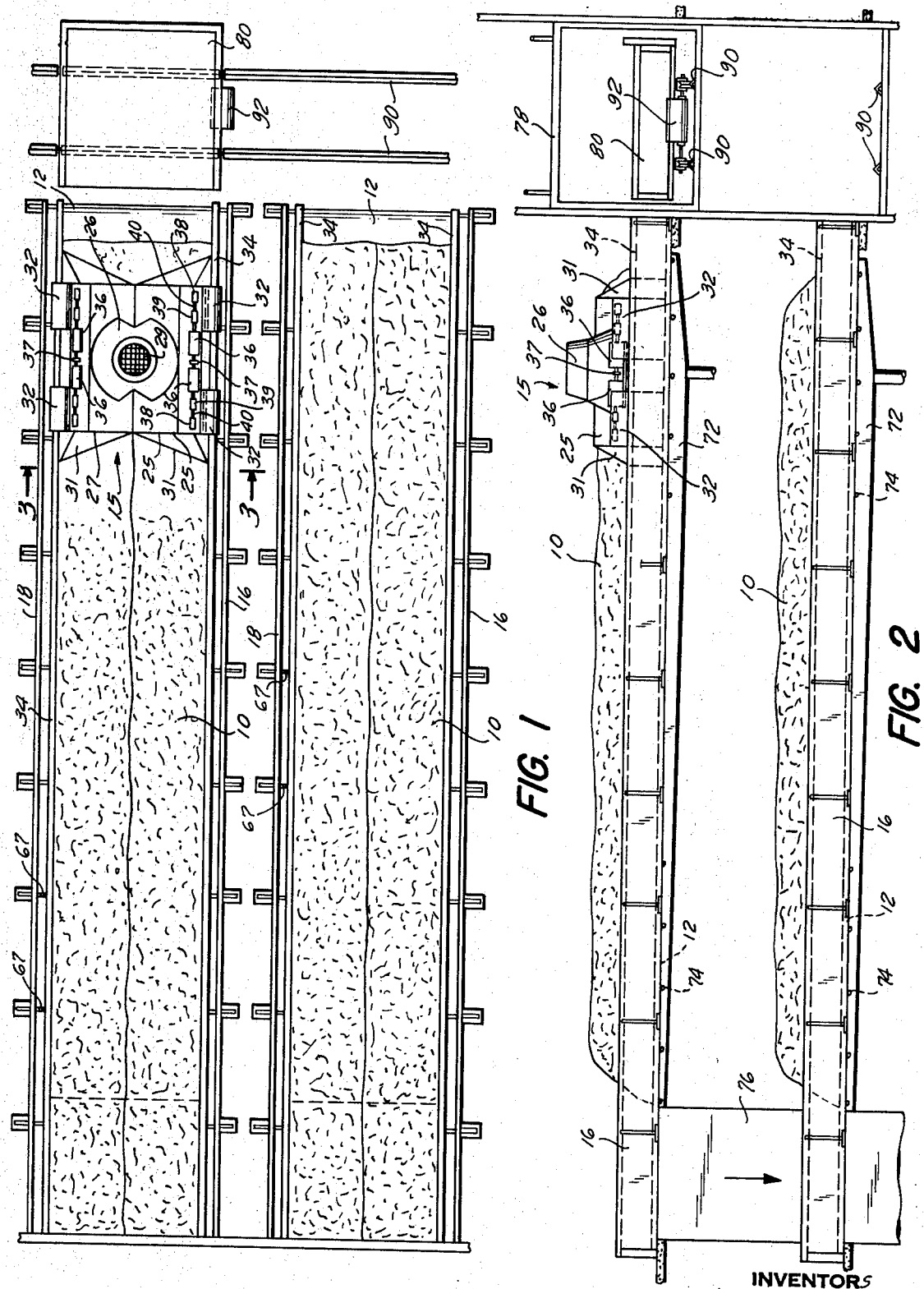

INVENTORS
IAN WESTWOOD-BOOTH
JOSEPH B. FERGUSON, JR.
BY
ATTORNEYS

Nov. 3, 1970

J. B. FERGUSON, JR., ETAL 3,537,689

WASTE MATERIAL TREATING APPARATUS

Filed June 14, 1968

INVENTORS
IAN WESTWOOD-BOOTH
JOSEPH B. FERGUSON, JR.
BY
James Franklin
ATTORNEYS

United States Patent Office 3,537,689
Patented Nov. 3, 1970

3,537,689
WASTE MATERIAL TREATING APPARATUS
Joseph B. Ferguson, Jr., Flushing, N.Y., and Ian Westwood-Booth, Hackensack, N.J., assignors to Federated Waste & Pollution Control Corporation, New York, N.Y., a corporation of New York
Filed June 14, 1968, Ser. No. 737,112
Int. Cl. B01f 15/00
U.S. Cl. 259—2
19 Claims

ABSTRACT OF THE DISCLOSURE

A waste material treating apparatus is moved along an elongated mass of waste material and causes successive portions of the waste material to be thoroughly agitated and aerated, and thereafter deposited in an elongated pile of predetermined size and shape. Means are provided for turbulently mixing the material with air while the material is confined within a chamber of appropriate volume. The apparatus can also be designed to function as a pile-shifting apparatus.

---

The present invention relates to waste material treating apparatus and, in particular, to an apparatus which is adapted to be utilized in the bacterial digestive conversion of organic waste material into compost or organic soil conditioner.

In recent years, the disposal and treatment of organic waste material, especially in large cities, has become a matter of great concern, largely as a result of the problem of water and air pollution resulting from some of the methods presently employed for the disposal of waste material. One particularly advantageous method of disposing of organic waste material and avoiding pollution problems is to treat the waste material with specified bacteria which act to convert it into useful, substantially odorless compost. The waste material is first washed and chopped, formed into a slurry, inoculated with the bacteria, and then placed into elongated trough-shaped receptacles where it is acted upon by the bacteria for a predetermined period under controlled temperature and humidity conditions. After the bacterial action has been completed, that is, after the waste material has been converted into compost, it is transferred into a hopper, from which it is removed to be shipped to locations where it is utilized preferably in soil treatment.

In such bacterial treatment of waste material, it is essential to provide a sufficient amount of oxygen to all portions of the waste material if the bacteria are to act in an efficient and rapid manner. Hence, it is necessary that the piled-up waste material be agitated and mixed with air from time to time during the treatment period. The more effectively this is done, the sooner will the bacterial conversion treatment be completed, and hence the sooner can a new batch of waste material be subjected to the same treatment. It follows that the capacity of a given installation to convert waste material will depend on how well the material under treatment is mixed with air.

Apparatus has been proposed for moving along a mass of waste material and agitating it, thereby to mix it with air. However, such apparatus has been inefficient in its mixing and aerating function, or has resulted in unsightly and unsanitary redeposition of the mixed material, or both, thus necessitating overly frequent mixing operations and time-consuming manual cleaning operations, both resulting in reduced productivity and increased cost of operation of a given installation.

It is therefore a prime object of the present invention to provide a waste material treating apparatus which increases the efficiency and speed of conversion of the waste material into useful organic soil conditioners.

It is a more specific object of the present invention to provide a waste material apparatus of the type described, in which the treated waste material is more efficiently agitated and aerated than heretobefore, thereby to increase the rate of the bacterial conversion action.

It is another object of the present invention to provide an apparatus which violently mixes and agitates the waste material, thereby to insure optimum contact of all of the material with air, while confining the material within an enclosure, thereby to prevent the material from escaping from its proper location.

It is yet a further object of the present invention to provide a waste material treating apparatus which trims or forms the pile of waste material into a predetermined size and shape after it has been agitated, whereby sanitation and cleanliness are enhanced and subsequent agitating and aerating operations are facilitated.

It is a further object of the present invention to provide a waste material treating apparatus in which the steps of mixing or agitating, aerating, and forming the pile of waste material into a predetermined size and shape, are all substantially and effectively performed by means of a single apparatus, these operations being effected with a minimum of external control.

It is still a further object of the present invention to provide a waste material treating apparatus which performs the agitating and aerating operations of the waste material in a reliable, efficient manner whereby the period required for the complete treatment and conversion of the waste material is reduced, and an increased amount of waste material may be treated in a given period of time by a particular installation.

It is yet a further object of the present invention to provide a waste material treating apparatus which is effective to aerate, agitate and form the waste material, and which also may have the capability of pushing or bulldozing the waste material from its receptacle upon the completion of the bacterial conversion action.

To these ends, the present invention provides a waste material treating apparatus which moves along an elongated mass or pile of organic waste material, the apparatus being dimensioned and formed in approximate correspondence to the size and shape of the pile of waste material. As the apparatus thus moves, means carried by the apparatus agitates successive portions of the waste material while maintaining that material enclosed within the confines of the apparatus. It also simultaneously forms or shapes the previously agitated waste material into a desired predetermined size and shape as it is redeposited in the proper place on its supporting surface, thus making for a clean and sanitary operation and facilitating subsequent operations on the waste material by the apparatus of this invention.

While a given portion of the waste material is being so agitated, air is forced into it to insure its thorough aeration, thus increasing the overall efficiency of the bacterial conversion action upon the waste material. In one exemplary embodiment of this invention, a chamber is provided in the apparatus in which the particles of waste material are thrown while they are being agitated and aerated. A blower is preferably provided in this chamber to force air downwards in opposition to the forced air supply, thus creating a magnified turbulence which further increases the efficiency and thoroughness of agitation and aeration of the waste material within the chamber.

The apparatus of the present invention also comprises means for pushing the waste material from the receptacle after it has undergone the bacterial treatment operation. Furthermore, the leading and trailing edges of the vehicle (depending on the direction of movement of the vehicle along the waste material pile) are provided with guiding elements to form and guide the waste material into the input maw of the vehicle.

To the accomplishment of the above, and to such other objects as may hereinafter appear, the present invention relates to the construction and arrangement of a waste material treating apparatus as defined in the appended claims and as described in this specification, taken together with the appended drawings, in which:

FIG. 1 is a top plan view of two adjacent piles of waste material, the apparatus of the present invention being shown operatively associated with one of these piles;

FIG. 2 is a side elevation of two piles of waste material vertically spaced from one another, the apparatus of the present invention being operatively associated with the upper pile;

A quantity of organic waste material 10, having previously been washed and stirred and inoculated with bacteria, is deposited onto the upper flight of conveyor 12 in the form of an elongated substantially triangular pile. The waste material is acted upon by the bacteria to be converted into an odorless compost which is subsequently removed from the conveyor and shiped to locations where it is used as a soil conditioner. To maximize the rate of activity of the bacteria, the waste material 10 is treated in an environment at controlled temperature and humidity conditions, and is mixed and aerated at predetermined intervals so that all portions of the waste material can receive the necessary supply of oxygen for the bacterial digestion and conversion process.

In a given treatment plant, a plurality of such piles 10 of waste material will be formed. As here disclosed, each pile 10 is formed on an endless conveyor 12, which may be located in a trough. The conveyors can, as shown in FIGS. 1 and 2, be located adjacent one another and on different levels. The material of each pile 10 will remain on its conveyor 12 for a relatively extended period (e.g. 12 days), and will be mixed and aerated a plurality of times (e.g. every other day) during that period. This invention relates to apparatus for carrying out that mixing and aerating operation with a high degree of efficiency.

Figure 3:
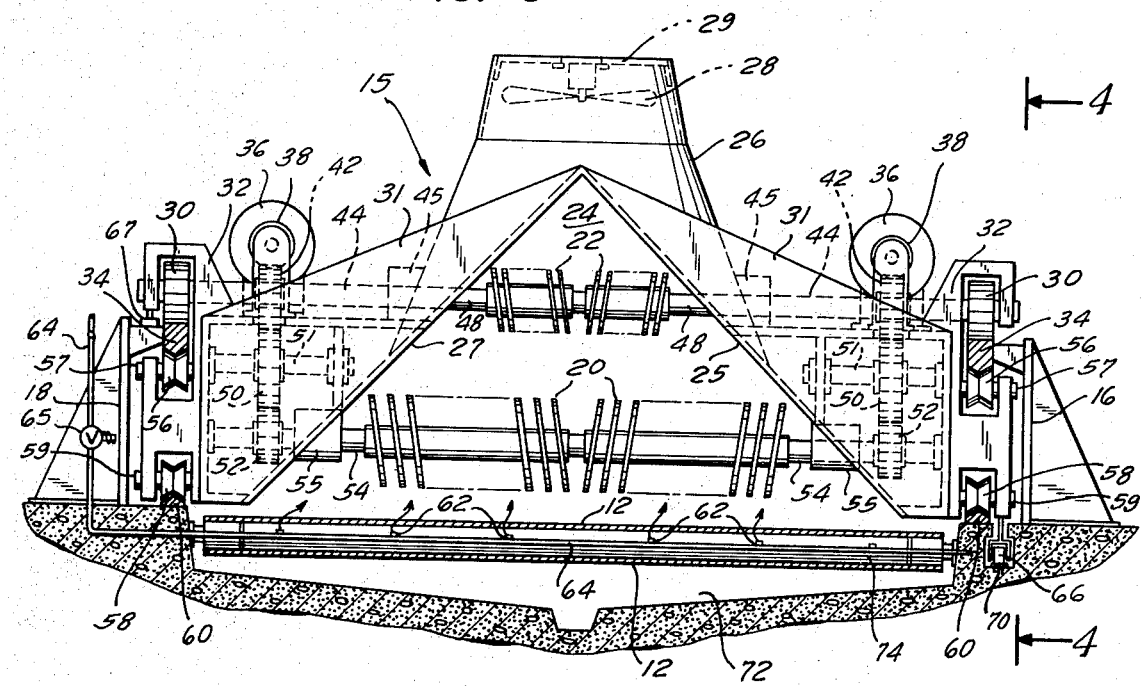
FIG. 3 is an end elevational view of the apparatus of the present invention, taken in the direction of line 3—3 of FIG. 1.
Figure 4:
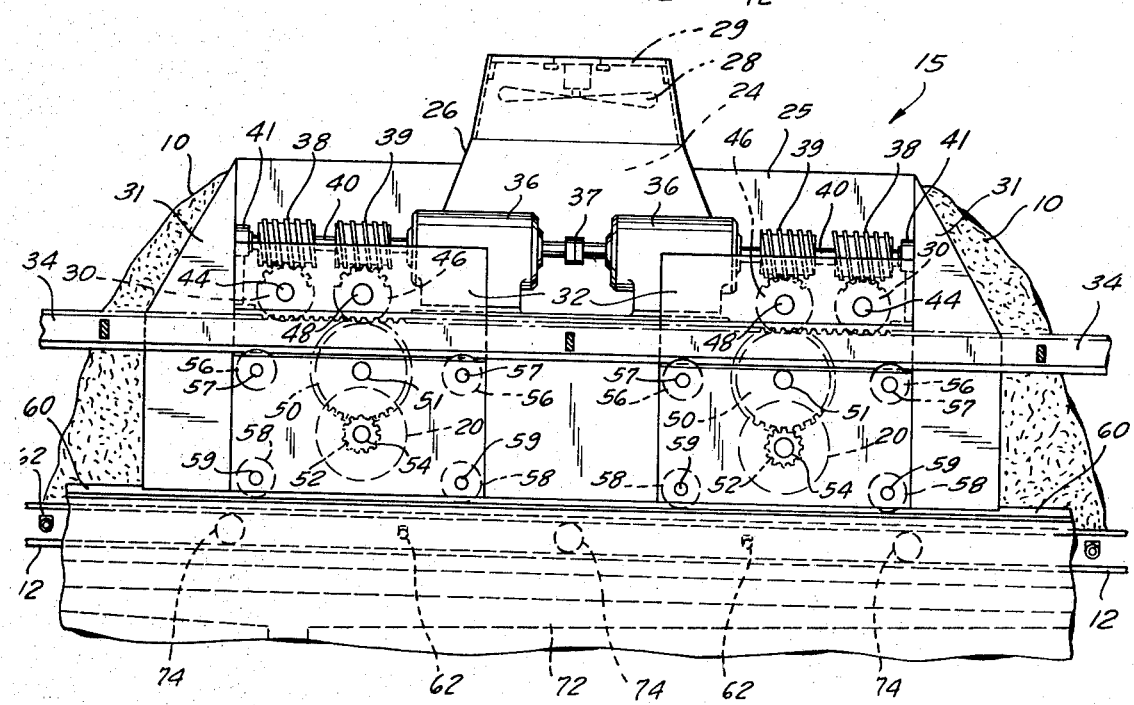
FIG. 4 is a side elevational view taken along line 4—4 of FIG. 3.
Figure 5:
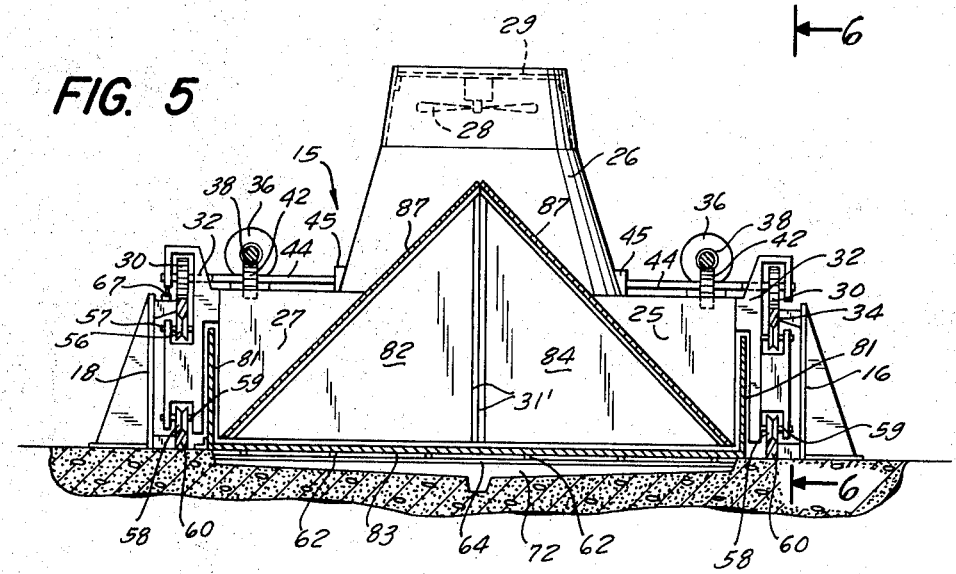
FIG. 5 is a view similar to that of FIG. 3 illustrating a second embodiment of the present invention.
Figure 6:
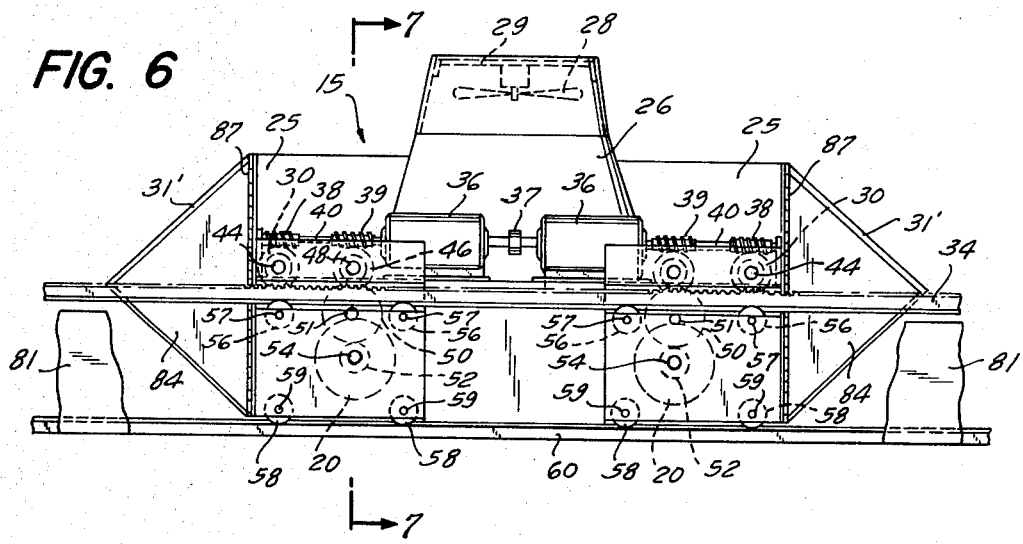
FIG. 6 is a view taken along line 6—6 of FIG. 5 with the doors of the second embodiment in the open position.
Figure 7:
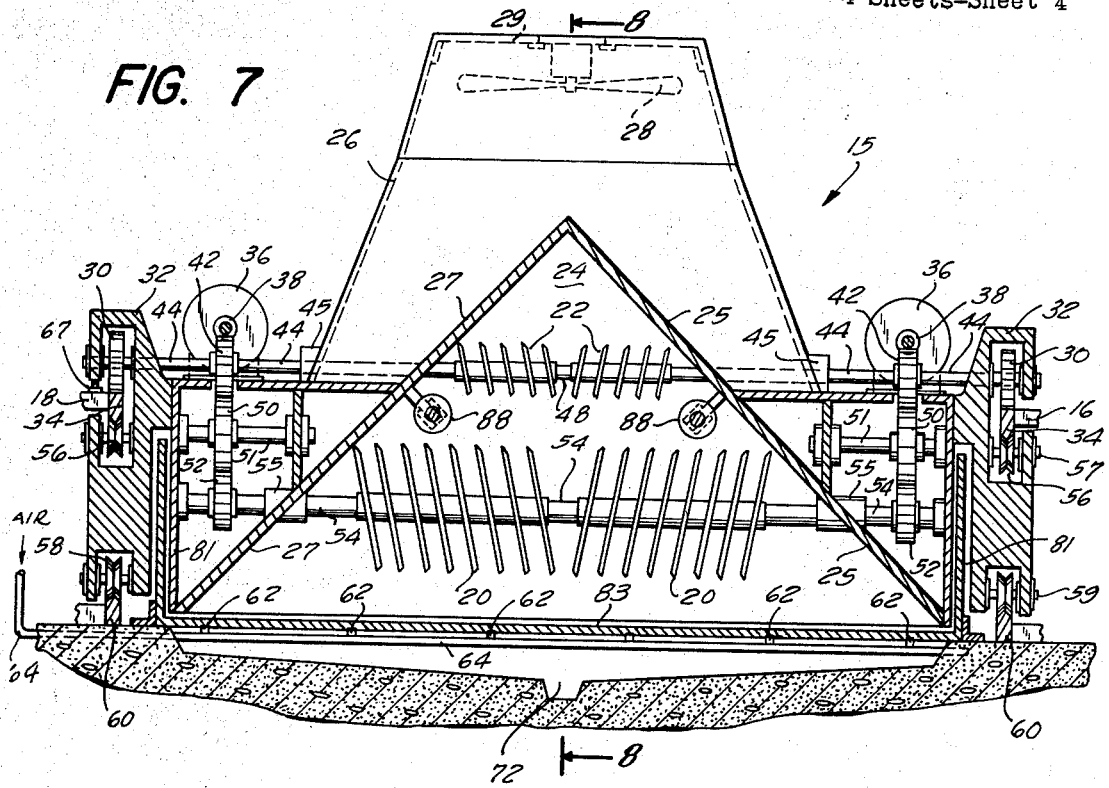
FIG. 7 is a view taken along line 7—7 of FIG. 6.
Figure 8:
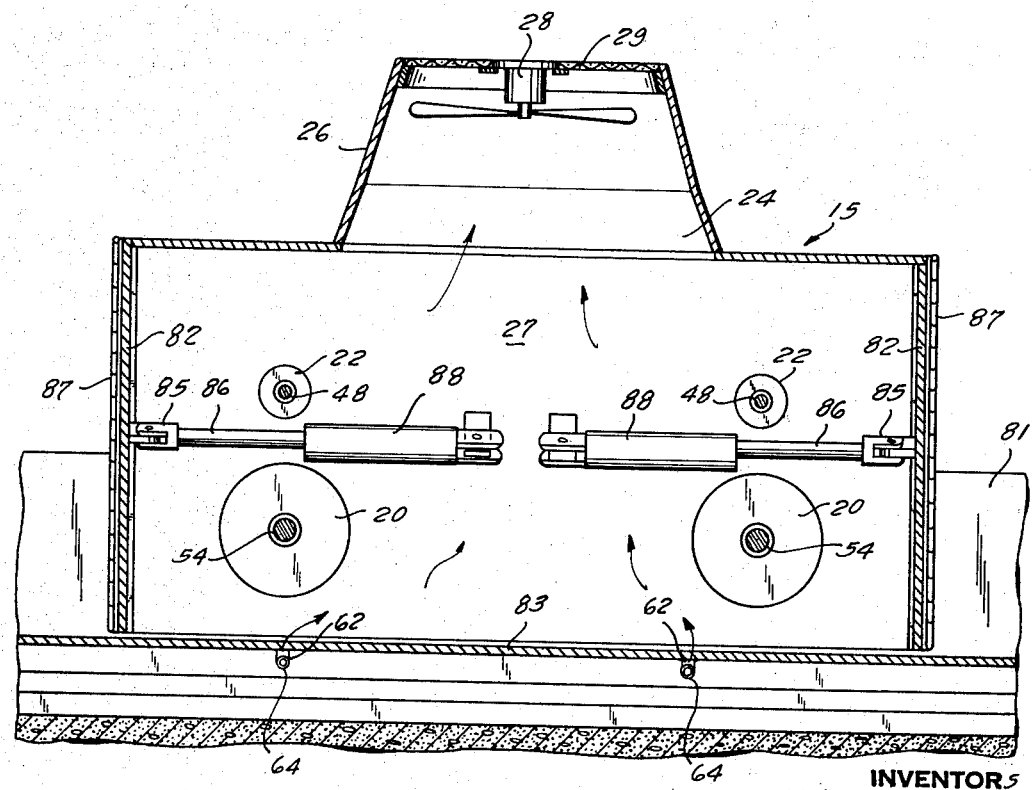
FIG. 8 is a view taken along line 8—8 of FIG. 7.

In accordance with the present invention, the waste material 10 is agitated and aerated by means of a treating apparatus which periodically travels along the mass of waste material on spaced side rails 16 and 18 located along each side of conveyor 12. The apparatus is in the form of a vehicle 15 having approximately the same cross-sectional shape and size as the pile of waste material 10 on conveyor 12 as viewed in its direction of travel along the pile (FIG. 3). As the vehicle 15 moves along the pile of waste material, agitating means in the form of a set of vertically spaced harrows 20 and 22 carried within vehicle 15 and located near the front and rear ends, respectively, of vehicle 15, turn up the waste material and throw the turned up material into a plenum or chamber 24 which is defined by a dome-shaped roof 26 arranged substantially centrally of vehicle 15, in which chamber 24 the material is thoroughly aerated. The set of harrows 20, 22 is provided both before and after the chamber 24. As the waste material is agitated in this manner, compressed air is forced upwards into the agitated portions of waste material and into chamber 24 to increase agitation and aid in the aerating operation.

As vehicle 15 moves along the triangular shaped pile of waste material, the walls 25 and 27, creating the generally triangular cross-sectional shape of vehicle 15 at its leading end, trim the portion of material entering vehicle 15 and present it to the harrows 20, 22; the similar walls 25, 27 at the trailing end of vehicle 15 trim and form the just agitated waste material into a pile, once again having a triangular cross-section and ensure its proper positioning on conveyor 12. Walls 25 and 27 each carry a flaring guide member 31 along their entire lengths at both the leading and trailing ends of vehicle 15, which guide members are effective to guide the portion of waste material directly ahead of vehicle 15 into the interior of the vehicle, where the material is then agitated.

A blower 28 is mounted at the upper wall of roof 26 and positioned above chamber 24, and depending on the direction of its rotation, either serves to create additional turbulence of the compressed air, and thus in the agitated particles of waste material within chamber 24, or to create a suction force drawing up the compressed air and the agitated waste material particles into chamber 24. A fine mesh screen 29 is provided at the top of roof 26 to allow air to enter or escape from chamber 24 while preventing the agitated particles of waste material from escaping from the chamber.

Vehicle 15 is driven along rails 16 and 18 by means of the engagement of cog wheels 30, rotatably mounted on side walls 32 of vehicle 15, with the upper toothed surfaces of a pair of racks 34 extending along each side of the pile of waste material and secured to each of side rails 16 and 18. To provide adequate power, duplicate driving assemblies are provided on each side of the apparatus (see FIG. 1); a description of a single assembly on one side of the apparatus will suffice for both. Drive is supplied to cog wheels 30 by a pair of drive motors 36 arranged in tandem by means of a coupling 37. A pair of worms 38 and 39 is mounted on a common shaft 40 driven by drive motors 36 and journalled in a bearing 41, worm 38 engaging worm gear 42 (see FIG. 3), secured to an axle 44 upon which cog wheel 30 is secured, the ends of axle 44 being journalled in bearing 45 and in side wall 32. When the drive motor 36 is thus operatively connected to cog wheels 30, causing them to ride along the upper surface of racks 34, vehicle 15 is thereby moved along rails 16 and 18 and thus along the length of the pile of waste material 10.

Worm 39 engages a worm gear 46 mounted on a shaft 48 journalled in suitable bearings (not shown), upper harrows 22 being carried on shaft 48 for rotation therewith. Worm gear 46 further engages a gear 50 carried on a rotatably mounted axle 51 which, in turn, engages a pinion 52 secured at one end of a shaft 54 journalled at either of its ends in a bearing 55, the lower set of harrows 20 being secured to shaft 54. Thus, the rotation of axle 40, caused by the operation of drive motors 36, is also effectively and operatively coupled to harrows 20 and 22, to cause rotation of the harrows. The side walls 32 also carry a plurality of notched wheels 56 and 58, rotatably mounted on axles 57 and 59 respectively, wheels 56 engaging the underside of rack 34 and wheels 58 engaging a track 60 running alongside conveyor 12 and having a cross-section mating therewith, so as to provide additional guidance and support for vehicle 15 as it moves along the pile of waste material 10.

Compressed air is supplied to chamber 24 from a plurality of sources of compressed air in the form of a plurality of air jets 62 arranged in substantially equally spaced rows along substantially the entire length of conveyor 12, at a level intermediate the upper and lower flights of the conveyor. The material of which conveyor 12 is formed is sufficiently porous to permit the compressed air to pass through the upper flight of the conveyor, while sufficiently impervious so that no waste material falls through the conveyor material. Compressed air is selectively supplied to each row of air jets 62 from a conduit 64 supplied from a source of compressed air (not shown). Each conduit 64 is selectively opened and closed by means of a solenoid operated valve 65, actuated when vehicle 15 engages a microswitch 67 carried on rail 18 and operatively connected to that solenoid, there being a plurality of such switches located on rail 18, each operatively connected to one of such solenoid valves and spaced from one another at a distance corresponding to the spacing between the rows of air jets 62. As vehicle 15 moves along the pile of waste material 10, successive switches 67 will be actuated so that their associated valves 65 will be alternately opened and closed in accordance with the position of the vehicle 15 along the conveyor 12. In this manner, compressed air will be injected upwardly into vehicle 15 and particularly into the agitated particles of waste material in chamber 24.

The electrical power necessary to operate drive motors 36 is supplied by means of conductors (not shown) connected to a conducting wheel 66 which rides along a channel extending along the length of conveyor 12 and which makes contact with an electrically conducting rail 70 to which electrical power is supplied so that drive motor 36 continuously receives electrical energy at any location of the travel of vehicle 15 along conveyor 12. A drainage or sump area 72, slanting towards the middle, is formed in the floor area beneath conveyor 12 to permit the drainage of the wash water from the waste material 10 during the period that the material is positioned on the conveyor during the conversion operation.

The operation of the waste material treatment apparatus of this invention is now believed to be apparent from the above description of an exemplary embodiment thereof. The vehicle 15 is driven by means of the drive motor 36 causing cog wheel 30 to rotate and engage the rack 34 to move the vehicle 15 along the waste material pile from one end of the pile to the other. During the travel of the vehicle 15, the guiding members 31 of the leading end of the vehicle 15 guide waste material from the pile into the interior or maw at the leading end of vehicle 15. The waste material within the interior of vehicle 15 is then choped and broken by the operation of the rotating sets of harrows 20 and 22. The harrows tend to move the material engaged thereby laterally inwardly and upwardly, providing an initial mixing and aeration and then toss or throw the material upwards into chamber 24 where the waste material particles are more thoroughly mixed and aerated. The air jets 62 located beneath the chamber 24 are actuated so that streams of compressed air are directed upwardly into the chamber 24 to further agitate and aerate the waste material particles within that chamber. The walls 25 and 27 at the leading end of vehicle 15 insure that the pile is properly presented to the harrows 20, 22, and those walls and those of the chamber 24 keep the material within the apparatus while it is being agitated and thoroughly aerated, a final agitation and mixing then being provided by the trailing set of harrows 20, 22.

As vehicle 15 continues to move along the pile of waste material 10, the agitated material falls and returns to the upper flight of conveyor 12. The triangular walls 25 and 27 at the trailing end of vehicle 15 ride over the newly agitated and fallen waste material now located at the trailing end of vehicle 15, and form this waste material into its initial approximately triangular cross-sectional shape.

After the vehicle has reached the other end of the pile that is, the lefthand end of the pile in FIG. 1, the direction of rotation of the drive motor 36 is reversed, causing the vehicle to return along the waste material pile now traveling in the opposite direction, that is, towards the right of FIG. 1, where the operation described above is repeated. Since the agitated pile had been formed into its original approximate triangular cross-sectional shape as a result of the forming action of the trailing triangular walls 25 and 27, the return travel and accompanying agitation operation is greatly facilitated, since the shape of the waste material pile once again corresponds to the cross-sectional size and shape of the entry maw of the vehicle 15. Substantially all the waste material enters into vehicle 15, with little or none of the waste material being pushed from the conveyor.

The mixing and aerating operation described above is preferably repeated approximately every other day for a period of approximately 12 days, after which time the waste material has been fully acted upon by the bacteria and has thus been converted into an odorless compost material suitable for use as a soil conditioner. It will be understood that during the conversion process the conveyor 12 was at rest. To remove the pocessed or converted waste material from the conveyor, all that need be done is to activate the conveyor drive rollers 74 to cause motion of the upper flight of conveyor 12 toward the left in FIG. 1, causing the waste material to fall from the conveyor into a hopper 76 located at the lefthand end of the conveyor, hopper 76 then being transferred to a remote shipping station.

When the waste material is being processed at a number of processing areas comprising a number of such conveyors arranged at different locations and at different levels as in the arrangement of FIGS. 1 and 2, it is desirable that a single treating apparatus be operative for a plurality of these storage and processing areas. Thus, an elevator 78 is located at one end of each conveyor 12 and carries a dolly 80 which rides along horizontal tracks 90 by means of a drive 92. Vehicle 15 may be carried on dolly 80 from one level to another and between the several processing areas at each level into registry with the individual conveyors. The guide wheels 56 and 58 of vehicle 15 engage their respective mating surfaces on the side rails 16 and 18, and the cog wheels 30 engage the toothed surfaces of racks 34 so that motion of vehicle 15 may be developed along the conveyor 12 when drive motors 36 are energized.

A second embodiment of this invention is illustrated in FIGS. 5-8 in which the waste material 10 is carried on an elongated receptacle or trough 81 positioned intermediate the side rails 16 and 18, and in which a pair of doors 82 and 84, each in the shape of a right triangle, are mounted respectively on walls 25 and 27, by means of hinges 87, at both the leading and trailing ends of vehicle 15. During the agitating and aerating operation of the vehicle 15, the doors 82 and 84 are opened (FIG. 6) by the operation of hydraulic pistons 86 pivotally connected to doors 82 and 84 by yokes 85 and reciprocably carried in hydraulic cylinders 88 secured to side walls 25 and 27. Hydraulic fluid is selectively introduced into cylinders 88 to operate pistons 86 in a well-known manner, the actual hydraulic control apparatus being omitted from the drawings for the sake of clarity.

Doors 82 and 84, which are positioned parallel to the rails 16 and 18 when they are thus opened, carry at their ends resilient flaring guide members 31' which are effective to guide the waste material 10 into the open area formed by the open doors, and into the interior maw of vehicle 15, where the agitation and aeration of the waste matter takes place in the same manner as in the previously described embodiment; the agitating and drive mechanisms of the two embodiments being substantially the same in most major respects, with the further difference that the air jets 62 are positioned directly beneath the porous bottom wall 83 of trough 81, wall 83 permitting the air to pass through it into the interior of vehicle 15, but being sufficiently solid to prevent the waste material from falling therethrough.

At the completion of the waste material conversion process, that is when the bacterial action has converted the waste material into useful compost, the removal of the treated waste material is effected by moving vehicle 15 along the pile of waste material for a distance of approximately 15 ft. back from the hopper-end of the pile with doors 82 and 84 still opened. The hydraulic cylinders 88 are then actuated to cause pistons 86 to operate and thereby close doors 82 and 84 at the leading end of vehicle 15, that is, at the end farthest away from the hopper 76. When the doors are thus closed, a quantity of waste is thus enclosed or entrapped within the vehicle 15, and the subsequent return motion of the vehicle 15 towards and over the hopper 76 carries that portion of the waste material enclosed within the vehicle 15 from trough 81 and empties that material into the hopper 76 below. The hydraulic cylinders 88 are then actuated to open doors 82 and 84 and vehicle 15 is then moved back towards the remaining waste material on the trough and moved again by approximately the same distance into and through the pile of waste material. The doors 82 and 84 are once again closed, and the waste material removal operation is repeated as before. This operation is repeated as often as necessary to remove the entire amount of the now processed waste material from the trough.

In a typical waste material processing plant thirty-six material receiving areas such as the conveyors 12 or trough 81 are provided, each area receiving a pile of waste material approximately 150 feet long, eight feet high at the apex of the triangle, and sixteen feet wide along the base of the triangular cross-section. Each pile will thus hold approximately 350 cubic yards and approximately 80 tons of waste material. Since it requires between ten and twelve days for a complete conversion operation for each pile of waste material, a plant comprising three levels, each level having twelve such material processing areas, could process approximately 250 tons of waste material each day.

Thus, the present invention has described an apparatus which, while moving along a pile of organic waste material, is effective to agitate, aerate and form the pile of waste material, all in an efficient and substantially automatic manner requiring little external control for its operation. The rate of bacterial treatment of the waste material is thus increased so that a given volume of waste material can be processed into useful compost in a shortened period of time, thereby permitting a greater rate of production or conversion of the waste material into compost or fertilizer for a given volume of plant space. All this has been done by the use of a single apparatus which performs all of the necessary operations for effectively improving the waste material treatment and conversion with a high degree of effectiveness and efficiency, and without spilling or spreading material away from where it belongs. Thus cleanliness and sanitaryness are not sacrificed even though the waste material is very thoroughly and even violently agitated.

It will be understood that the details of the embodiments here specifically disclosed can be widely varied, all without departing from the present invention. For example, mixing means other than harrows could be used, fewer or more such means could be provided, different driving means (e.g. hydraulic means) could be utilized, and other variations will suggest themselves. The essential features of the invention are defined in the following claims.

We claim:

1. A mixing apparatus for processing waste material arranged in an elongated mass, said apparatus comprising means for moving said apparatus along said elongated mass, means for agitating suscessive portions of said mass of said waste material as said apparatus moves therealong, and means for forming said successively agitated portions of said waste mterial, after agitation, into a pile having a predetermined cross-sectional shape, and means separate from said agitating means for forcing air into said portions of said waste material as they are being agitated.

2. The apparatus of claim 1, further comprising means independent of said air forcing means for producing a turbulence in said air and hence in said agitated portions of said waste material as they are being agitated.

3. The apparatus of claim 2, in which said air forcing means is located beneath said mass of waste material, and said turbulence producing means comprises blower means.

4. The apparatus of claim 3, in which said agitating means is located vertically intermediate said air forcing means and said blower means.

5. The apparatus of claim 4, further comprising roof means defining an enlarged chamber located above said mass of waste material, said agitated successive portions of waste material being scattered within said chamber during the agitation thereof.

6. The apparatus of claim 4, in which said agitating means comprises harrows means operatively driven by said apparatus moving means.

7. The apparatus of claim 6, in which said agitating means further comprises a second harrows means laterally spaced within said apparatus from said first mentioned harrows means.

8. The apparatus of claim 7, in which said forming means comprises walls located at at least one end of said apparatus, said walls being shaped so as to define said predetermined cross-section.

9. The apparatus of claim 8, further comprising roof means defining an enlarged chamber located above said mass of waste material, said agitated successive portions of waste material being scattered within said chamber during the agitation thereof.

10. A composting apparatus for processing waste material arranged in an elongated mass, said apparatus comprising means for moving said apparatus along the length of said elongated mass of waste material, means for agitating successive portions of said waste material as said apparatus moves along said elongated mass, and means separate from said agitating means for forcing air through said agitated portions of waste material as said portion is being agitated by said agitating means.

11. The apparatus of claim 10, further comprising means for forming said successively agitated portions of waste material into a pile of such material having a predetermined cross-section, in which said forming means comprises walls located at at least one end of said apparatus, said walls being shaped so as to define said predetermined cross-section.

12. The apparatus of claim 10, further comprising roof means defining an enlarged chamber located above said mass of waste material, said agitated successive portions of waste material being scattered within said chamber during the agitation thereof, said air forcing means being active on said material when it is in said chamber.

13. A composting apparatus for processing waste material arranged in an elongated mass, said apparatus comprising means for moving said apparatus along the length of said elongated mass, said apparatus including chamber means of volume greater than that of the portion of said waste material mass registering therewith at any given moment, and means for agitating successive portions of said waste material as said apparatus moves along said elongated mass, said agitating means being effective to cause said portion of said mass registering with said chamber to enter said chamber and be dispersed through said chamber and means separate from said agitating means for forcing a supply of air into said chamber as said registering portion of said mass is dispersed through said chamber.

14. In the apparatus of claim 13, blower means independent of said air supply forcing means for producing turbulence in said chamber.

15. In the apparatus of claim 13, means for producing turbulence in the air in said chamber.

16. A mixing apparatus for processing waste material arranged in an elongated mass, said apparatus comprising means for moving said apparatus along said elongated ma said apparatus comprising means defining a passage through which said material passes as said apparatus is moved along said mass, door means mounted on said apparatus and moveable between closed and open positions respectively blocking and freeing said passage, and means for moving said door means between said closed and open positions, said door means being adapted to be open when mixing and redepositing of said material is desired, said door means being adapted to be closed when shifting of the position of said mass is desired.

17. The apparatus of claim 16, in which said passage comprises an entry and an exit, said door means being located at said exit.

18. The apparatus of claim 16, in which said passage comprises means for forming said successively agitated portions of said waste material, after agitation, into a pile having a predetermined cross-sectional shape.

19. A mixing apparatus for processing waste material arranged in an elongated mass, said apparatus comprising means for moving said apparatus along said elongated mass, means for agitating successive portions of said mass of said waste material a said apparatus moves therealong, and means for forming said successively agitated portions of said waste material, after agitation, into a pile having a predetermined cross-sectional shape, roof means defining an enlarged chamber located above said mass of waste material, said agitated successive portions of waste material being scattered within said chamber during the agitation thereof, and said agitating means comprising first and second harrows means spaced from one another and operatively driven by said apparatus moving means, said chamber being located between said first and second harrows means.

References Cited
UNITED STATES PATENTS

| | | | |
|---|---|---|---|
| 579,771 | 3/1897 | Prinz | 259—126 |
| 587,444 | 8/1697 | Kraft | 259—126 |
| 3,369,797 | 2/1968 | Cobey | 259—28 |

ROBERT W. JENKINS, Primary Examiner